(12) United States Patent
Kim

(10) Patent No.: US 11,911,674 B2
(45) Date of Patent: Feb. 27, 2024

(54) GOLF TEE AND MANUFACTURING METHOD THEREOF

(71) Applicant: Jong Seon Kim, Gyeonggi-do (KR)

(72) Inventor: Jong Seon Kim, Gyeonggi-do (KR)

( * ) Notice: Subject to any disclaimer, the term of this patent is extended or adjusted under 35 U.S.C. 154(b) by 0 days.

(21) Appl. No.: 17/881,577

(22) Filed: Aug. 4, 2022

(65) Prior Publication Data
US 2023/0038574 A1 Feb. 9, 2023

(30) Foreign Application Priority Data

Aug. 6, 2021 (KR) .................. 10-2021-0103842
Jul. 25, 2022 (KR) .................. 10-2022-0091891

(51) Int. Cl.
*A63B 57/13* (2015.01)
*B29C 45/00* (2006.01)
*B29C 45/16* (2006.01)
*B29L 31/52* (2006.01)

(52) U.S. Cl.
CPC .......... *A63B 57/13* (2015.10); *B29C 45/0017* (2013.01); *B29C 45/1615* (2013.01); *B29L 2031/52* (2013.01)

(58) Field of Classification Search
CPC ................................ A63B 57/13; A63B 57/10
See application file for complete search history.

(56) References Cited

U.S. PATENT DOCUMENTS

| | | | | |
|---|---|---|---|---|
| 2,146,736 A * | 2/1939 | Hammond | ............. | A63B 57/10 473/401 |
| 2,712,939 A * | 7/1955 | Harp | ............. | A63B 57/19 473/265 |
| 2,839,304 A * | 6/1958 | Lerick | ............. | A63B 57/12 473/396 |
| 3,414,268 A * | 12/1968 | Chase | ............. | A63B 57/16 473/396 |
| 3,966,214 A * | 6/1976 | Collins | ............. | A63B 57/19 473/397 |
| 4,524,974 A * | 6/1985 | Matsuura | ............. | A63B 57/10 473/396 |
| 4,645,208 A * | 2/1987 | Morabeto | ............. | A63B 57/10 473/396 |
| 6,899,644 B1 * | 5/2005 | Song | ............. | A63B 57/13 473/397 |
| 7,704,166 B2 * | 4/2010 | Lim | ............. | A63B 57/16 473/401 |
| 8,439,771 B1 * | 5/2013 | Fleming | ............. | A63B 57/13 473/397 |

(Continued)

FOREIGN PATENT DOCUMENTS

GB 2608655 A * 1/2023 ............. A63B 57/10
KR 100701333 4/2007

(Continued)

*Primary Examiner* — Steven B Wong
(74) *Attorney, Agent, or Firm* — JCIPRNET

(57) ABSTRACT

Disclosed herein are a golf tee used when a golfer hits a tee shot and a method of manufacturing the same. The golf tee includes a support inserted into the ground and a rotary portion coupled to the support and having a head on which a golf ball is placed, wherein the rotary portion is adjustable in angle and thus can be easily restored to a correct vertical position when the angle of the rotary portion with respect to the support is changed due to impact upon hitting.

7 Claims, 23 Drawing Sheets

(56) References Cited

U.S. PATENT DOCUMENTS

| | | | | |
|---|---|---|---|---|
| 8,460,127 | B2 * | 6/2013 | Kumar | A63B 57/10 |
| | | | | 473/387 |
| 9,216,338 | B1 * | 12/2015 | Lee | A63B 57/13 |
| 2005/0261089 | A1 * | 11/2005 | Homby | A63B 57/10 |
| | | | | 473/387 |
| 2006/0058120 | A1 * | 3/2006 | Anton | A63B 57/12 |
| | | | | 473/387 |
| 2013/0331206 | A1 * | 12/2013 | Kumar | A63B 57/10 |
| | | | | 473/396 |
| 2014/0378247 | A1 * | 12/2014 | Lee | A63B 57/10 |
| | | | | 473/397 |
| 2023/0094874 | A1 * | 3/2023 | Murphy | A63B 57/13 |
| | | | | 473/386 |

FOREIGN PATENT DOCUMENTS

| | | | | | |
|---|---|---|---|---|---|
| KR | | 101894480 B1 * | 9/2018 | | |
| WO | WO-2005021109 A1 * | 3/2005 | | | A63B 57/10 |
| WO | WO-2006004308 A1 * | 1/2006 | | | A63B 57/10 |

* cited by examiner

GOLF TEE AND MANUFACTURING METHOD THEREOF

CROSS-REFERENCE TO RELATED APPLICATION

This application claims the priority benefit of Korea Application No. 10-2021-0103842, filed on Aug. 6, 2021 and Korea Application No. 10-2022-0091891, filed on Jul. 25, 2022. The entirety of the above-mentioned patent application is hereby incorporated by reference herein and made a part of this specification.

BACKGROUND

Technical Field

The present invention relates to a golf tee used when a golfer hits a tee shot. More particularly, the present invention relates to a golf tee which includes a support inserted into the ground and a rotary portion coupled to the support and having a head on which a golf ball is placed, wherein the rotary portion is adjustable in angle and can be easily restored to a correct vertical position when the angle of the rotary portion with respect to the support is changed due to impact upon hitting, and a method of manufacturing the same.

Description of Related Art

Each hole in golf starts from a tee box. A player inserts a golf tee into the ground on the tee box, places a golf ball on the top of the golf tee, and drives the golf ball off the golf tee.

A golf tee generally has a recessed upper end to place a golf ball thereon and has a pointy lower end to be easily inserted into the ground.

Such a golf tee is formed of an inelastic material such as wood or plastic, and is inserted into the ground at an appropriate height depending on the height of a golfer or the type of golf club.

As such, the golf tee is formed of a hard material and has a structure in which a head supporting a golf ball is integrally formed with a body inserted into the ground.

As a related art of the present invention, Korean Patent Registration No. 10-0701333 (2007 Apr. 3) discloses a golf tee including a tee body having a magnet at an upper portion thereof, a cap having a thread formed on an inner periphery thereof to be coupled to the tee body and a rotary portion coupling groove formed therein, a rotary portion having a magnet embedded at a lower portion thereof and attached to the magnet of the tee body and a bolt disposed thereon to be rotatably inserted into and secured to the rotary portion coupling groove of the cap, a golf ball holder separately formed with the tee body, disposed on an upper surface of the tee body, coupled to the bolt of the rotary portion to be rotatable in conjunction with the rotary portion, and having an upper surface in which a golf ball is placed.

However, the golf tee is costly to manufacture due to use of the magnets and the bolt, is not easy to assemble, and is inconvenient to use.

In addition, since the angle of the golf tee is changed due to impact upon hitting a golf ball off the golf tee, restoration of a support member and a rotary member to a vertically aligned position is frequently required. Further, fine control is needed to adjust the support member and the rotary member to the vertically aligned position.

RELATED LITERATURE

<Patent Document> Korean Patent Registration No. 10-0701333 (Apr. 3, 2007)

SUMMARY

Embodiments of the present invention are conceived to solve such problems in the art and it is one aspect of the present invention to provide a golf tee including a support inserted into the ground and a rotary portion rotatably coupled to the support and allowing a golf ball to be placed thereon, wherein the golf tee can be easily installed perpendicular to the ground through adjustment of the angle of the rotary portion on the support, can minimize damage thereto by allowing the rotary portion to rotate in a hitting direction upon hitting a golf ball, and can achieve easy restoration of the support and the rotary portion to a vertically aligned position after hitting, and a method of manufacturing the same.

It is another aspect of the present invention to provide a golf tee including a support and a rotary portion coupled to each other by injection molding, wherein one of the support and the rotary portion has a protrusion and the other one has a receiving groove receiving the protrusion therein, thereby allowing easy restoration of the support and the rotary portion to a correct vertically aligned position when the angle of the rotary portion with respect to the support is changed, and a method of manufacturing the same.

In accordance with one aspect of the present invention, a golf tee includes: a support inserted into the ground; and a rotary portion rotatably coupled to the support and having an upper surface on which a golf ball rests, wherein the rotary portion includes a head on which the golf ball is placed and a coupling portion formed opposite the head and coupled to the support; and the support includes a pointed insertion portion formed at a lower portion thereof and inserted into the ground, a hollow receiving portion formed at an upper portion thereof and protruding above the ground, the receiving portion having an insertion hole open at one side thereof, multiple cutouts formed in the receiving portion to allow the receiving portion to be elastically deformable such that the coupling portion of the rotary portion is inserted into or separated from the receiving portion, a stepped portion protruding outside an upper surface of the receiving portion, and a securing member coupled to an outer circumferential surface of the receiving portion to firmly secure the coupling portion inserted into and coupled to the receiving portion through a clamping operation, the securing member having a ring shape.

The cutouts may be formed in an upper hemisphere of the receiving portion with respect to a center of the receiving portion to protect the coupling portion from impact upon hitting and to facilitate coupling/separation of the receiving portion to/from the coupling portion.

In accordance with another aspect of the present invention, a golf tee includes: a support inserted into the ground; and a rotary portion rotatably coupled to the support and having an upper surface on which a golf ball rests, wherein the support includes a pointed insertion portion formed at a lower portion thereof and inserted into the ground, a hollow receiving portion formed at an upper portion thereof and protruding above the ground, the receiving portion having an insertion hole open at one side thereof, and a stepped portion protruding outside an upper surface of the receiving portion; the rotary portion includes a head formed at one side thereof and allowing a golf ball to rest thereon and a coupling portion formed at the other side thereof and coupled to the support; the coupling portion of the rotary portion is inserted into and coupled to the receiving portion of the support; and the coupling portion has a protrusion formed at a portion of an outer circumferential surface thereof and the receiving portion has a receiving groove receiving the protrusion therein such that the support and the rotary portion are vertically aligned with each other with the protrusion received in the receiving groove.

In accordance with a further aspect of the present invention, a golf tee includes: a support inserted into the ground; and a rotary portion rotatably coupled to the support and having an upper surface on which a golf ball rests, wherein the rotary portion includes a head formed at one side thereof and allowing a golf ball to rest thereon, a hollow receiving portion formed at the other side thereof and having an open insertion hole, and a stepped portion protruding outside a lower surface of the receiving portion; the support includes a pointed insertion portion formed at a lower portion thereof and inserted into the ground and a coupling portion formed at an upper portion thereof, protruding above the ground, and coupled to the rotary portion; the coupling portion of the support is inserted into and coupled to the receiving portion of the rotary portion; and the coupling portion has a protrusion formed at a portion of an outer circumferential surface thereof and the receiving portion has a receiving groove receiving the protrusion therein such that the support and the rotary portion are vertically aligned with each other with the protrusion received in the receiving groove.

The support may further include: multiple cutouts formed in the receiving portion to allow the receiving portion to be elastically deformable such that the coupling portion of the rotary portion is coupled to or separated from the receiving portion; and a securing member coupled to an outer circumferential surface of the receiving portion to firmly secure the coupling portion inserted into and coupled to the receiving portion through a clamping operation.

The protrusion may include at least one protrusion formed at a portion of the outer circumferential surface of the coupling portion or may be continuously formed around the outer circumferential surface of the coupling portion; the receiving groove may include at least one receiving groove formed at a portion of an inner peripheral surface of the receiving portion or may be continuously formed around the inner peripheral surface of the receiving portion; and the support and the rotary portion may be vertically aligned with each other with the protrusion received in the receiving groove.

The securing member may be coupled to an upper hemisphere of the receiving portion with respect to a center of the receiving portion and may be held in position by the stepped portion.

In accordance with yet another aspect of the present invention, a method of manufacturing a golf tee including a support inserted into the ground and a rotary portion rotatably coupled to the support and having an upper surface on which a golf ball rests includes: a primary injection molding step in which a rotary portion having a protrusion is formed by injection molding using a rotary portion mold; an insertion step in which the rotary portion formed in the primary injection molding step is inserted in a vertically aligned position into an insertion space in a molding groove of a support mold; and a secondary injection molding step in which a support having a receiving groove receiving the protrusion of the rotary portion therein is formed by injection molding using the support mold with the rotary portion inserted into the insertion space, wherein the primary injection molding step and the secondary injection molding step are performed under different injection molding conditions.

The primary injection molding step may include forming a rotary portion having a protrusion by injection molding or forming a support having a protrusion by injection molding; the insertion step may include inserting the rotary portion formed in the primary injection molding step into an insertion space of a molding groove of a support mold or inserting the support formed in the primary injection molding step into an insertion space of a molding groove of a rotary portion mold; when the injection molded product formed in the primary injection molding step is the rotary portion, the secondary injection molding step may include forming a support having a receiving groove receiving the protrusion of the rotary portion therein by injection molding using the support mold with the rotary portion inserted into the insertion space; and, when the injection molded product formed in the primary injection molding step is the support, the secondary injection molding step may include forming a rotary portion having a receiving groove receiving the protrusion of the support therein by injection molding using the rotary portion mold with the support inserted into the insertion space.

The primary injection molding step and the secondary injection molding step may be performed using different materials or at different temperatures.

Embodiments of the present invention provide a golf tee including a support inserted into the ground and a rotary portion rotatably coupled to the support and allowing a golf ball to be placed thereon, wherein the golf tee can be easily installed perpendicular to the ground through adjustment of the angle of the rotary portion on the support, can minimize damage thereto by allowing the rotary portion to rotate in a hitting direction upon hitting a golf ball, and can achieve easy restoration of the support and the rotary portion to a vertically aligned position after hitting.

In addition, embodiments of the present invention provide a golf tee including a support and a rotary portion coupled to each other by injection molding, wherein one of the support and the rotary portion has a protrusion and the other one has a receiving groove receiving the protrusion therein, thereby allowing easy restoration of the support and the rotary portion to a correct vertically aligned position when the angle of the rotary portion with respect to the support is changed.

BRIEF DESCRIPTION OF THE DRAWINGS

The above and other aspects, features, and advantages of the present invention will become apparent from the detailed description of the following embodiments in conjunction with the accompanying drawings.

DESCRIPTION OF THE EMBODIMENTS

Figure 1:
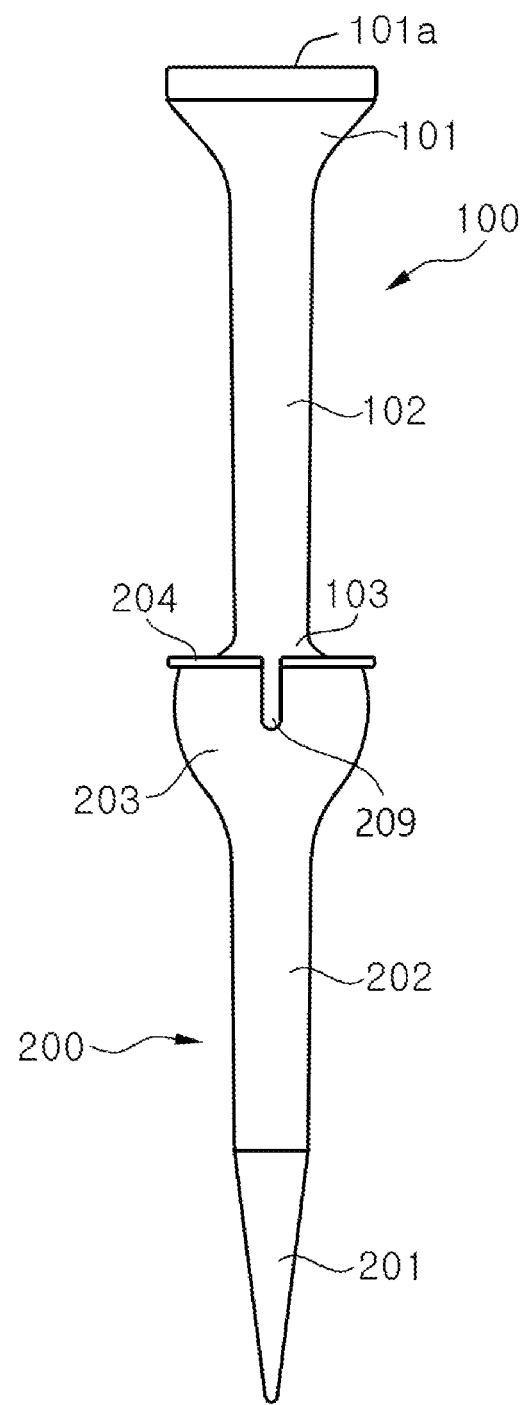
FIG. 1 and FIG. 2 are views of a golf tee according to one embodiment of the present invention.
Figure 2:
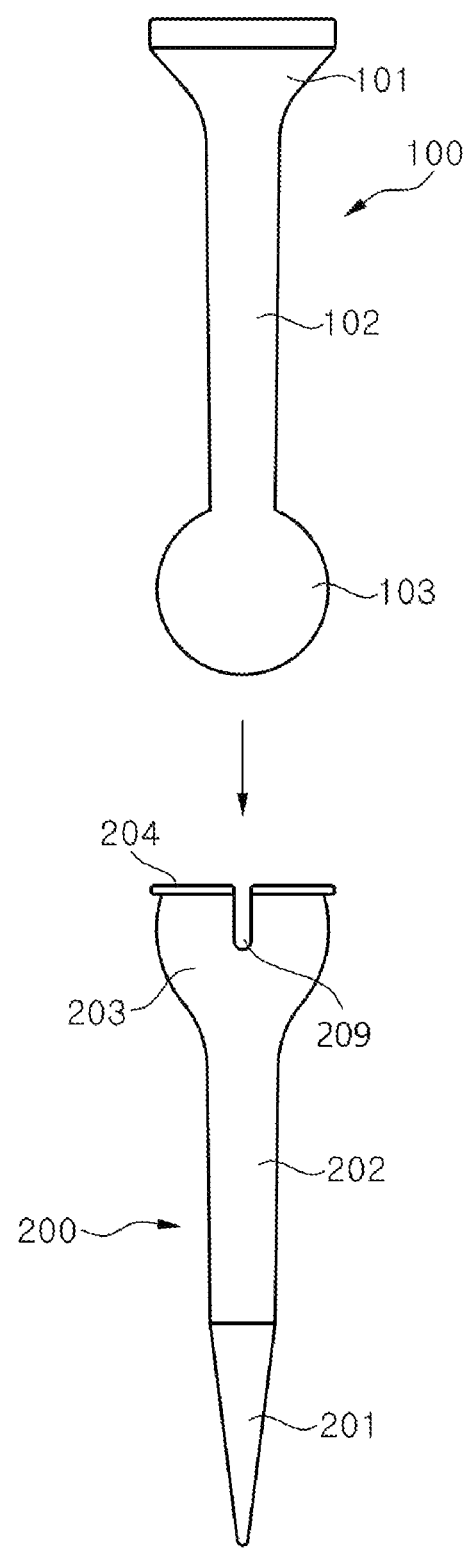
Figure 3:
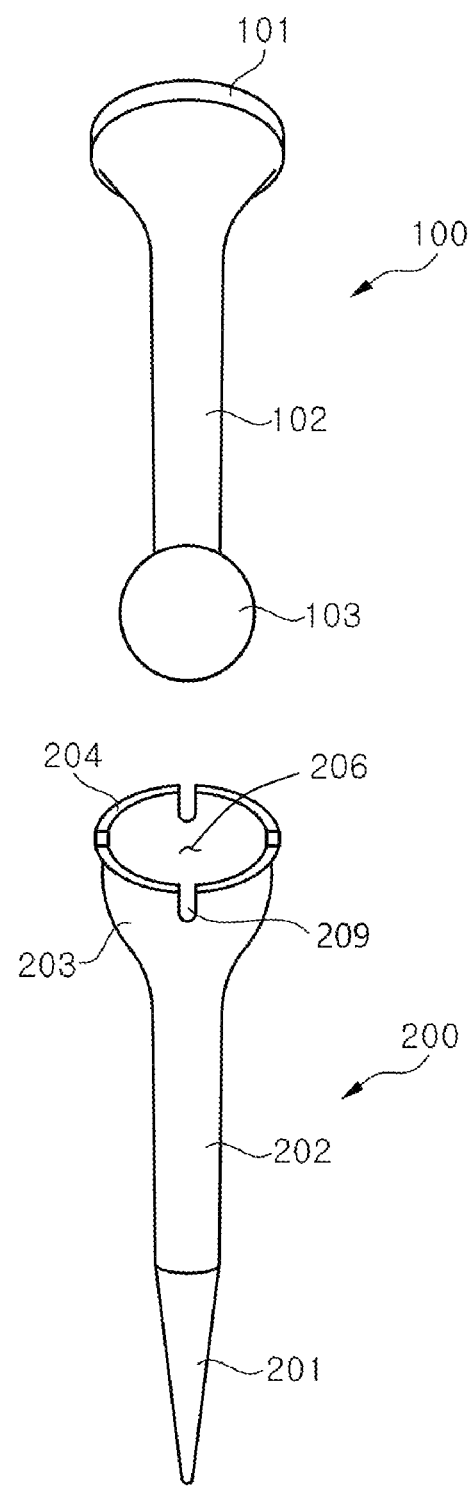
FIG. 3 is an exploded view of the golf tee according to the embodiment.
Figure 4:
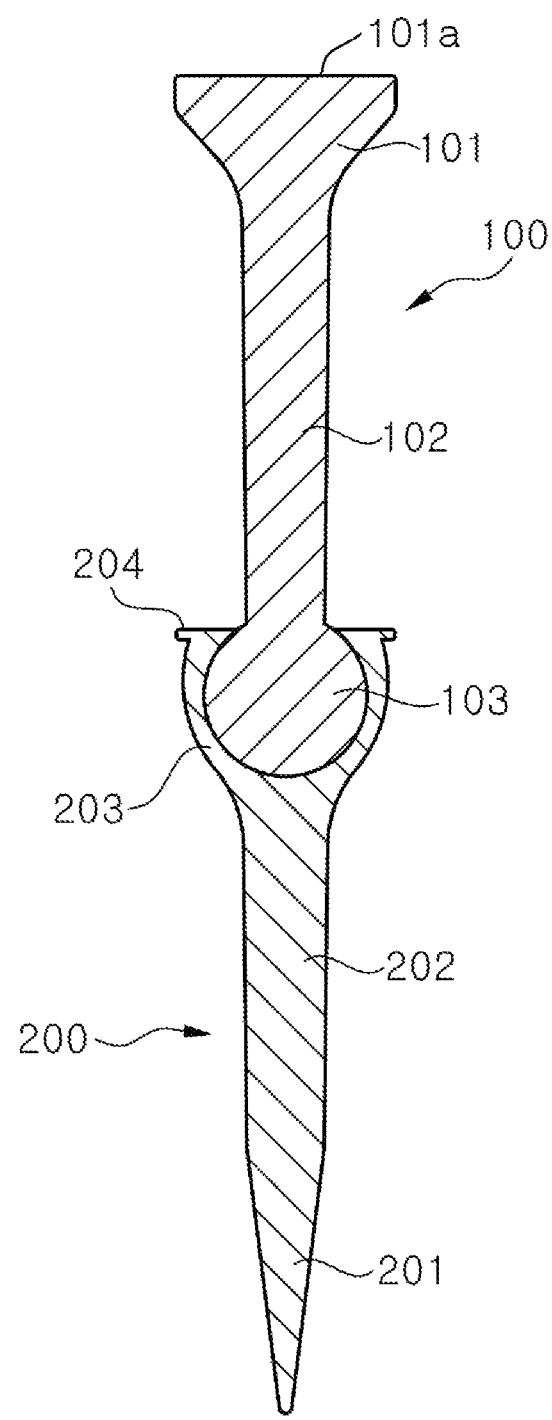
FIG. 4 is a sectional view of the golf tee according to the embodiment.
Figure 5:
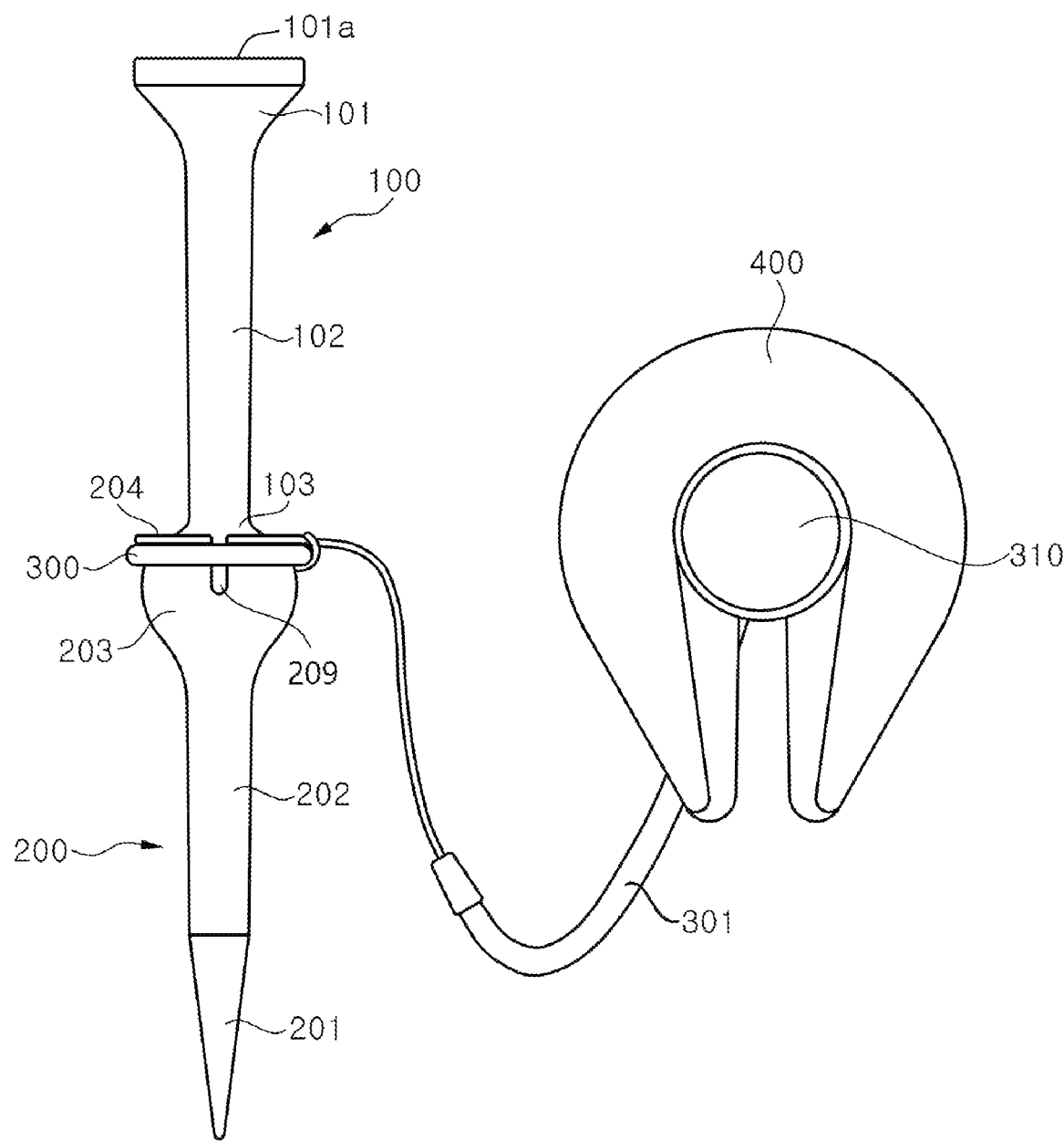
FIG. 5 is a view of the golf tee according to the embodiment, with a securing member and a loss prevention member coupled thereto.

Hereinafter, embodiments of the present invention will be described with reference to the accompanying drawings.

It should be understood that the present invention is not limited to the following embodiments and may be embodied in different ways, and that the embodiments are provided for complete disclosure and thorough understanding of the present invention by those skilled in the art. The scope of the present invention is defined only by the claims.

Description of known functions and constructions which may unnecessarily obscure the subject matter of the present invention will be omitted.

Hereinafter, a golf tee according to the present invention will be described with reference to the accompanying drawings.

Referring to FIG. 1 to FIG. 24, a golf tee according to the present invention is used to hold a golf ball off the ground on a tee box, and includes a support 200 inserted into the ground and a rotary portion 100 rotatably coupled to the support 200 and having an upper surface on which a golf ball rests.

The support 200 may be provided in the form of a straight plastic rod, and may have a pointed lower end to be easily inserted into the ground on the tee box.

The support 200 is formed at an upper end thereof with a hollow receiving portion 203 having a spherical shape, wherein the receiving portion 203 has an open insertion hole 208 formed on an upper surface thereof.

Here, the insertion hole 208 of the receiving portion 203 is preferably formed in an upper hemisphere of the receiving portion 203 with respect to a center of the receiving portion 203.

In this way, the rotary portion 100 can be freely rotatably retained in the receiving portion 203 with a coupling portion 103 of the rotary portion 100 inserted into the receiving portion 203.

Here, the receiving portion 203 includes a cutout 209 to facilitate coupling of the coupling portion 103 of the rotary portion 100 to the receiving portion 203. In addition, due to the cutout 209, the receiving portion 203 can be elastically deformed to facilitate insertion/separation of the coupling portion 103 into/from the receiving portion 203.

That is, due to the cutout 209, the insertion hole 208 can be expanded in size upon inserting the coupling portion 103 into the receiving portion 203 and can be reduced in size after insertion of the coupling portion 103, thereby allowing smooth insertion of the coupling portion 103 into the receiving portion 203 of the support 200.

The cutout 205 is formed in the upper hemisphere of the receiving portion 203 with respect to the center of the receiving portion 203 to achieve both protection of the coupling portion 203 from impact upon hitting and ease of coupling of the coupling portion 203.

In addition, the receiving portion 203 may be formed at an upper end thereof with a stepped portion 204 protruding outside the upper surface of the receiving portion 203.

The rotary portion 100 may also be formed of plastics.

Particularly, the rotary portion 100 and the support 200 may be formed of various plastics having high impact resistance, such as acrylonitrile-butadiene-styrene (ABS).

That is, the golf tee according to the present invention may include a support 200 inserted into the ground and a rotary portion 100 rotatably coupled to the support 200 and having an upper surface on which a golf ball rests.

The support 200 may include: a pointed insertion portion 210 formed at a lower portion thereof and inserted into the ground; a hollow receiving portion 203 formed at an upper portion thereof, protruding above the ground, and having an insertion hole 208 open at one side thereof; and a stepped portion 204 protruding outside an upper surface of the receiving portion 203.

The rotary portion 100 may include: a head 101 formed at one side thereof and allowing a golf ball to rest thereon; and a coupling portion 103 formed at the other end thereof and coupled to the support 200.

The coupling portion 103 of the rotary portion 100 may be inserted into and coupled to the receiving portion 203 of the support 200. Here, the coupling portion 103 may have a spherical shape to be rotatable at various angles in the hollow receiving portion 203.

The golf tee according to the present invention may further include a securing member 300 disposed around an outer circumferential surface of the receiving portion 203 to firmly secure the coupling portion 103 received in the receiving portion 203 through a clamping operation, wherein the securing member 300 may be formed in the shape of a ring through injection molding or may be formed of an elastic material.

The securing member 300 may be coupled to the upper hemisphere of the receiving portion 203 with respect to the center of the receiving portion 203. Since the receiving portion 203 is curved toward the center thereof, the securing member 300 coupled to the outer circumferential surface of the receiving portion 203 has limited downward movement while being movable upwards.

Here, the stepped portion 204 prevents separation of the securing member 300 from the receiving portion 203 by restricting movement of the securing member 300 beyond the upper end of the upper hemisphere of the receiving portion 203.

The rotary portion 100 may be provided in the form of a straight plastic rod.

The rotary portion 100 may be formed at the upper end thereof with the head 101 extending outwards to place a golf ball thereon. The head 10 may be formed on an upper surface thereof with a resting portion 101a on which a golf ball rests.

The rotary portion 100 may be formed at the lower end thereof with a spherical coupling portion 103 inserted into and rotatably coupled to the receiving portion of the support.

With the coupling portion 103 coupled to the receiving portion 203, the rotary portion 100 may be rotatable with respect to the receiving portion 203 of the support 200.

Accordingly, with the support 200 vertically inserted into the ground on the tee box, the rotary portion 100 may be positioned to be collinear with the underlying support 200.

Then, with the golf tee 100 including the rotary portion 100 and the support 200 of the golf tee 10 in a vertical position with respect to the ground, a golf ball to be hit is placed on the head 101 of the rotary portion 100.

Upon hitting the golf ball, the rotary portion 100 can be rotated in a hitting direction by hitting force, whereas the support 200 can remain inserted into the ground, thereby preventing loss of the golf tee 10.

Nevertheless, the support 200 can be separated from the ground on the tee box when the golf ball is hit with strong force.

Here, in order to prevent the golf tee 10 from moving far from an original location thereof, a loss prevention member 400 may be connected to the golf tee 10.

With the coupling portion 103 at the lower end of the rotary portion 100 received in the receiving portion 203 of the support 200, the outer surface of the coupling portion 103 contacts the inner surface of the receiving portion 203. Accordingly, upon hitting the golf ball, the coupling portion 103 of the rotary portion 100 can be rotated while remaining coupled to the receiving portion 203 of the support 200.

When the golf tee 10 is inserted into the ground on the tee box with the support 200 of the golf tee 10 inclined with respect to the ground, the rotary portion 100 on the support 200 may be moved to an upright position perpendicular to the ground.

Since the coupling portion 103 at the lower end of the rotary portion 100 is in surface contact with the receiving portion 203 of the support 200, the rotary portion 100 can stably remain in the upright position.

Then, a golf ball to be hit may be placed on the head of the rotary portion 100 rotated on the support 200 to a position perpendicular to the ground.

That is, according to the present invention, even when the golf tee 10 is inserted into the ground with the support 200 of the golf tee 10 inclined with respect to the ground, a golf ball can be placed on the head 101 of the rotary portion 100 by rotating the rotary portion 100 on the support 200 to a position perpendicular to the ground without reinserting the golf tee 10, whereby the golf tee 10 can be easily installed on the ground in one try.

Figure 6:
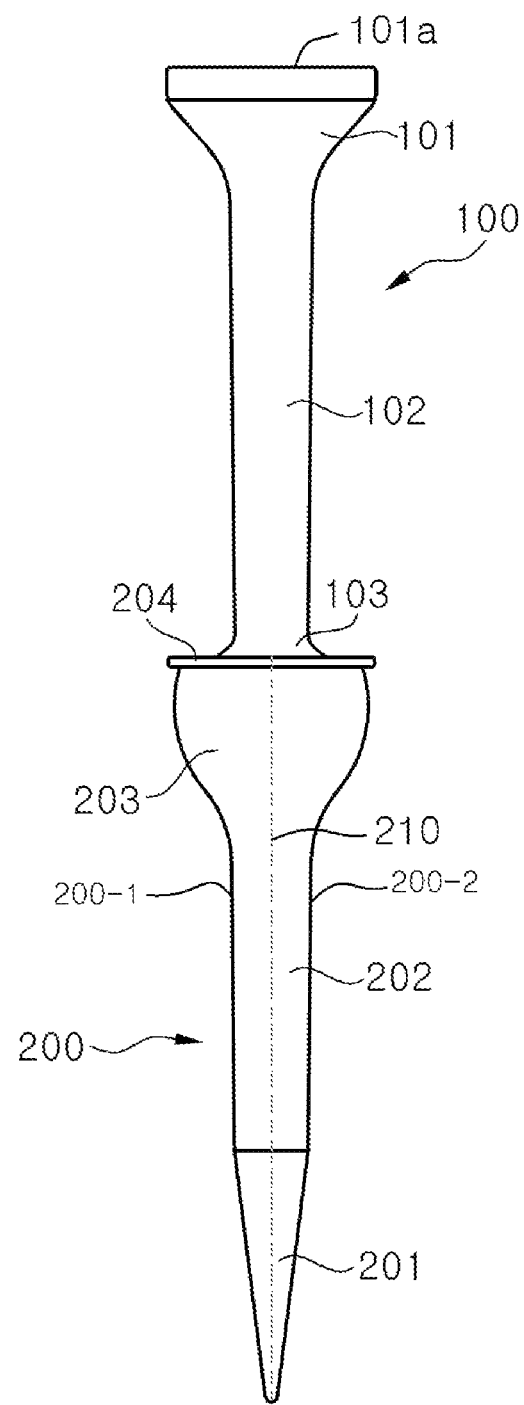
FIG. 6 is a view of a golf tee according to another embodiment of the present invention.
Figure 7:
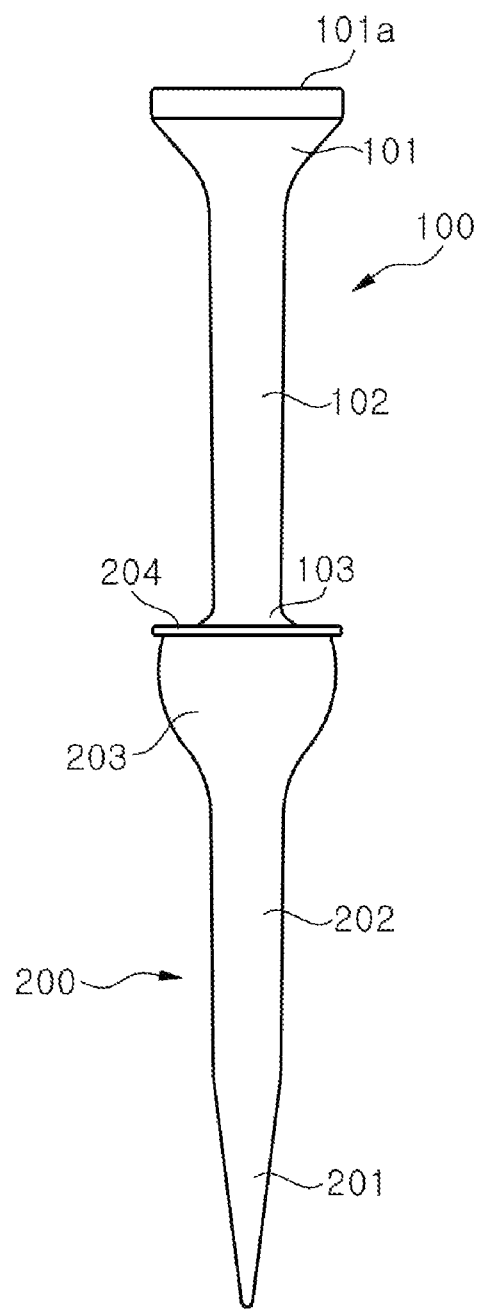
FIG. 7 is a view the golf tee according to the embodiment, with a support and a rotary portion thereof coupled to each other.

Referring to FIG. 6, the golf tee according to another embodiment of the present invention may include a support 200 comprising two halves, that is, a first support 200-1 and a second support 200-2.

Here, the support 200 may be formed by coupling the first support 200-1 to the second support 200-2 by welding 200 (for example, ultrasonic welding, vibration welding, or chemical welding).

According to this embodiment, the first support 200-1 and the second support 200-2 may be securely coupled to each other by welding after coupling the rotary portion 100 to the first support 200-1 and the second support 200-2. In this way, the rotary portion 100 can be firmly received in the support 200 formed by coupling the first support 200-1 to the second support 200-2 and thus can be prevented from being separated from the support 200.

The golf tee according to this embodiment differs from the golf tee of FIG. 1 in that the cutout 205 is omitted since coupling between the support 200 and the rotary portion 100 is established differently from that in the golf tee of FIG. 1. Particularly, since the support 200 is formed by coupling the first support 200-1 to the second support 200-2 by welding with the rotary portion 100 received in the receiving portion defined in the first support 200-1 and the second support 200-2, the golf tee according to this embodiment can more effectively prevent separation of the rotary portion 100 from the support 200 due to impact upon hitting.

Figure 8:
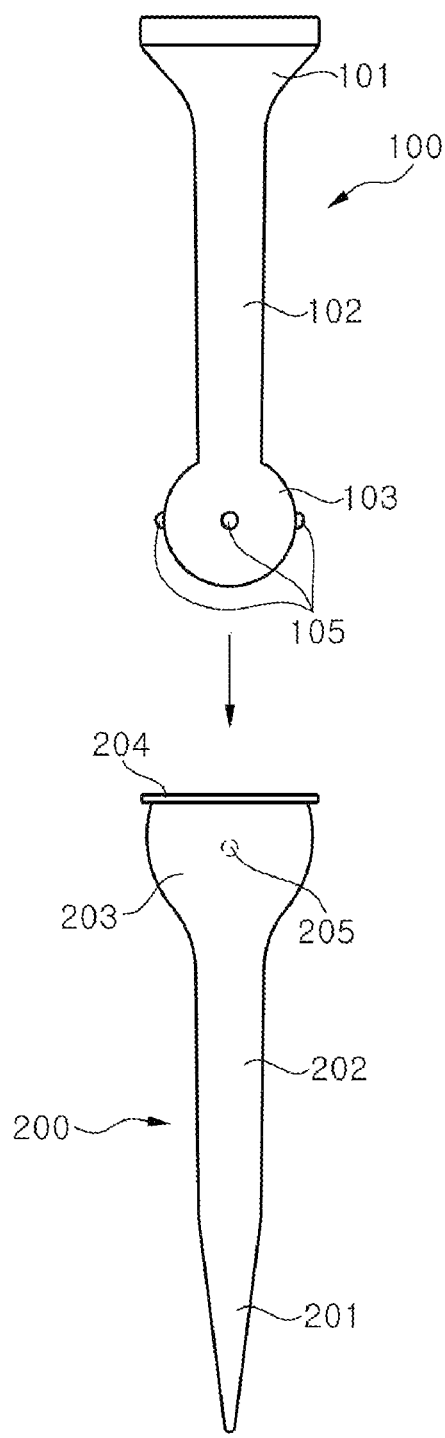
FIG. 8 is a view of the golf tee according to the embodiment, with the support separated from the rotary portion.
Figure 9:
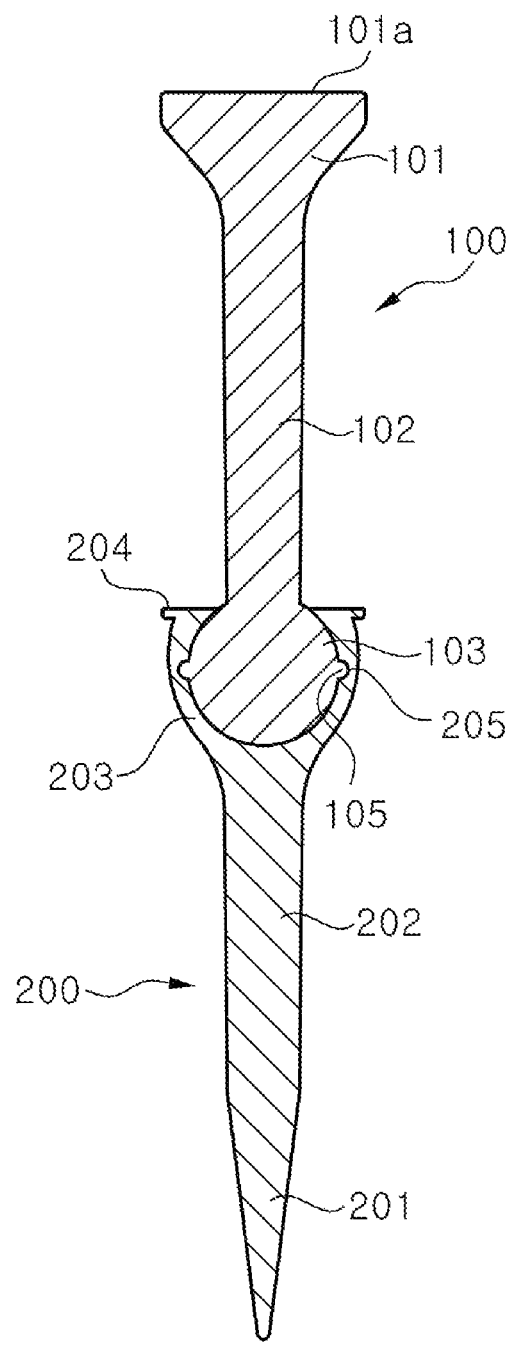
FIG. 9 is a sectional view of the golf tee according to the embodiment, with the support coupled to the rotary portion.
Figure 10:
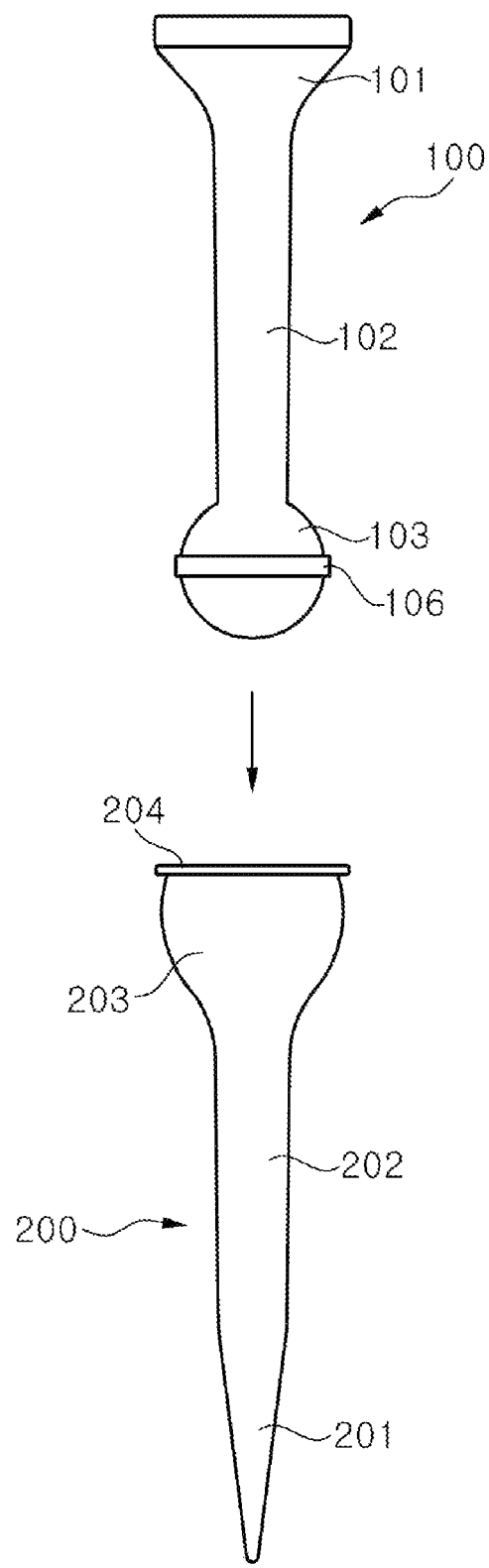
FIG. 10 to FIG. 13 are views illustrating a support and a rotary portion of a golf tee according to yet another embodiment of the present invention.
Figure 11:
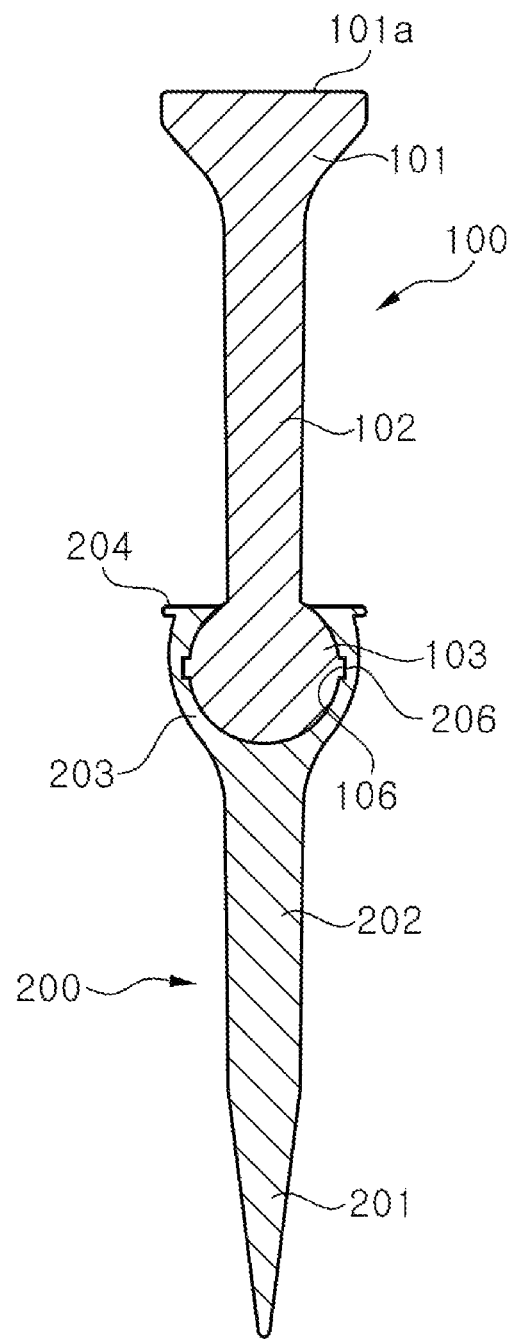
Figure 12:
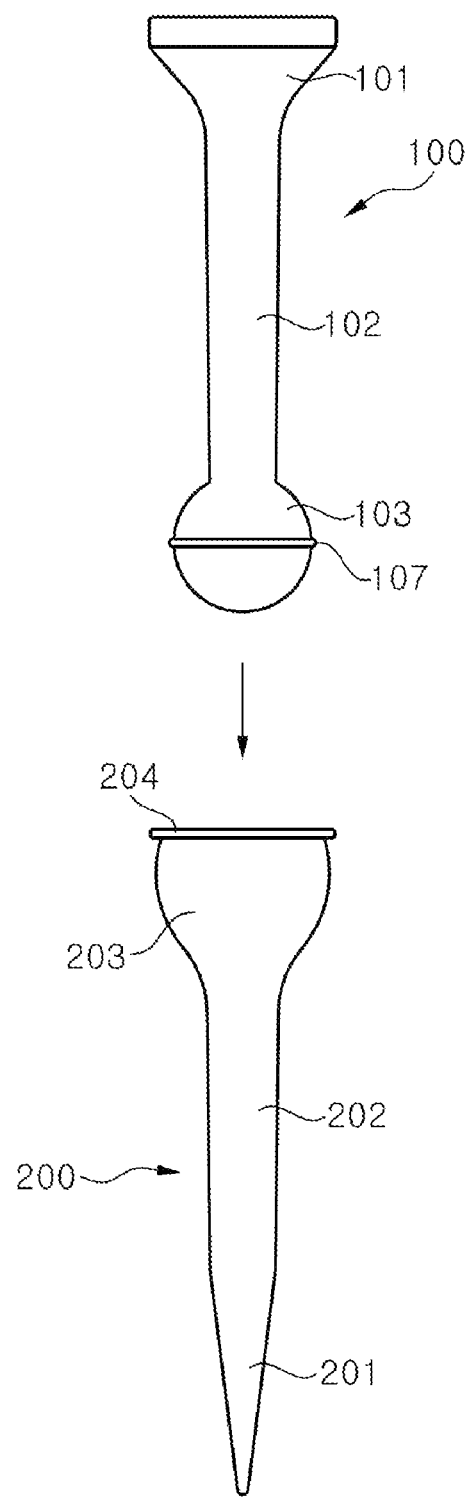
Figure 13:
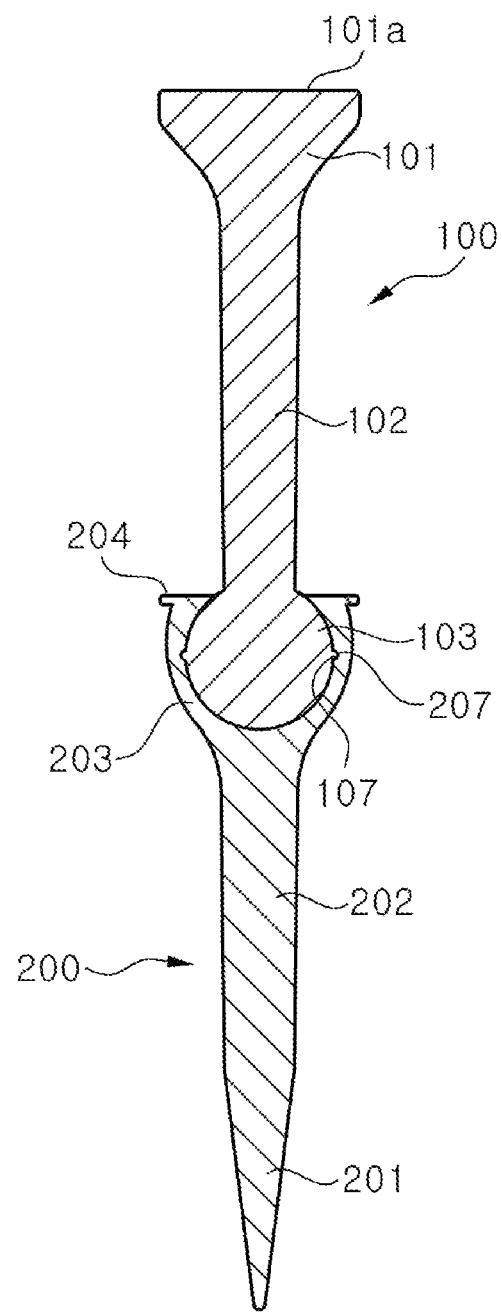

Referring to FIG. 8 and FIG. 9, the coupling portion 103 has a protrusion 105 formed at a portion of an outer circumferential surface thereof and the receiving portion 203 has a receiving groove 205 receiving the protrusion 105 therein, such that the support 200 and the rotary portion 100 can be vertically aligned with each other with the protrusion 105 received in the receiving groove 205.

That is, when the protrusion 105 is received in and coupled to the receiving groove 205, the support 200 and the rotary portion 100 are vertically aligned with each other and, when the protrusion 105 is separated from the receiving groove 205, the angle of the rotary portion 100 with respect to the support 200 is changed.

Accordingly, the support 200 and the rotary portion 100 can be automatically aligned with each other upon coupling of the protrusion 105 to the receiving groove 205.

FIG. 10 to FIG. 13 are views illustrating the support and the rotary portion of the golf tee according to other embodiments of the present invention. The coupling portion 103 may have at least one protrusion 105 formed at a portion of the outer circumferential surface thereof, as shown in FIG. 8. Alternatively, the coupling portion 103 may have a protrusion 106 or 107 continuously formed around the outer circumferential surface thereof, as shown in FIG. 10 to FIG. 13.

In addition, the receiving portion 203 may have at least one receiving groove 205 formed at a portion of the inner peripheral surface thereof, as shown in FIG. 8. Alternatively, the receiving portion 203 may have a receiving groove 206 or 207 continuously formed around the inner peripheral surface thereof, as shown in FIG. 10 to FIG. 13.

That is, the protrusion 106 or 107 may be continuously formed around a central outer surface of the coupling portion 103 and the receiving groove 206 or 207 may be formed at a location corresponding to the protrusion 106 or 107 to be coupled to the protrusion 106 or 107.

With the protrusion 106 or 107 received in the receiving groove 206 or 207, the rotary portion 100 may be in a vertical position with respect to the support 200. Accordingly, the support 200 and the rotary portion 100 can be vertically aligned with each other by inserting the protrusion 106 or 107 into the receiving groove 206 or 207.

Figure 14:
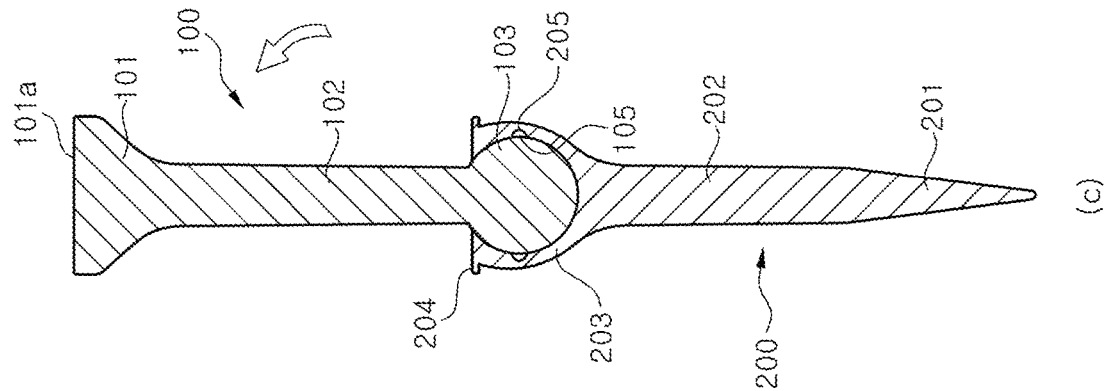
FIG. 14 is a view illustrating positions of the rotary portion of the golf tee in use.
Figure 14:
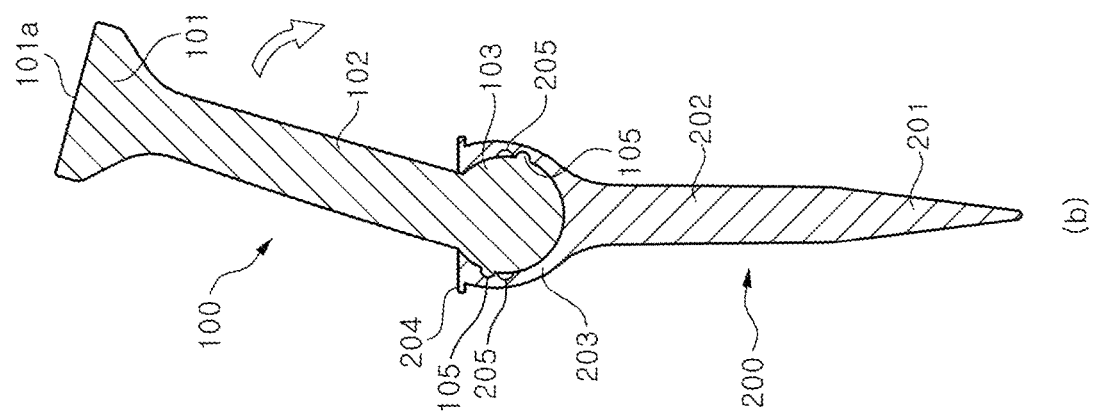
Figure 14:
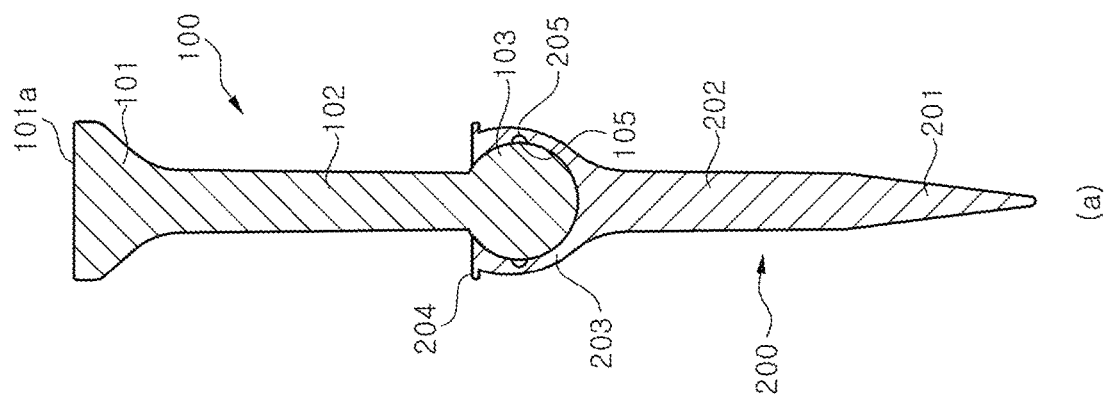
Figure 15:
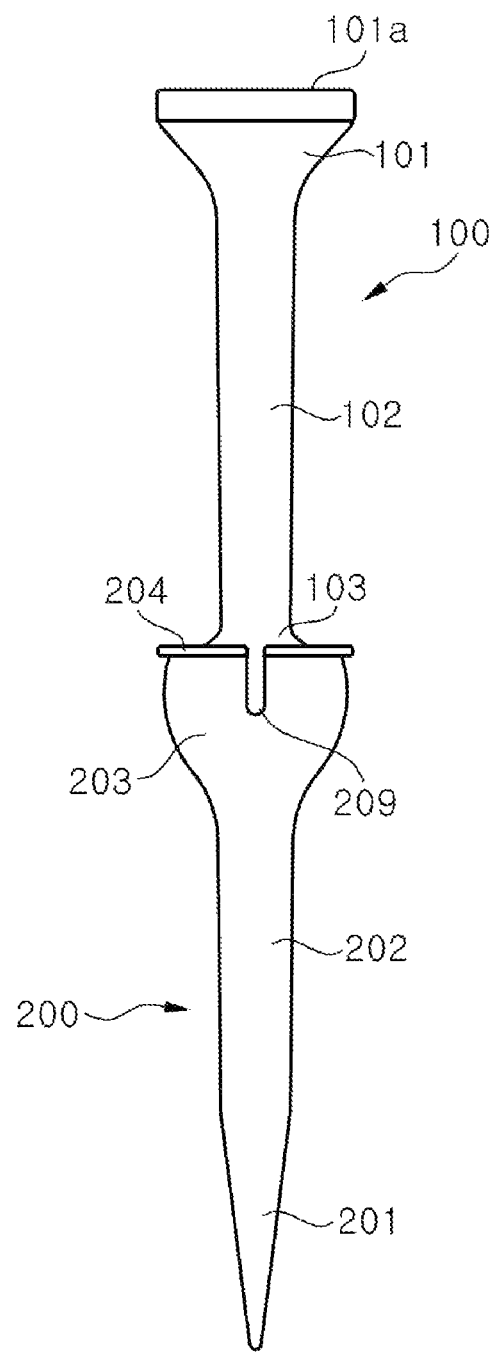
FIG. 15 to FIG. 18 are views illustrating a support and a rotary portion of a golf tee according to yet another embodiment of the present invention.
Figure 16:
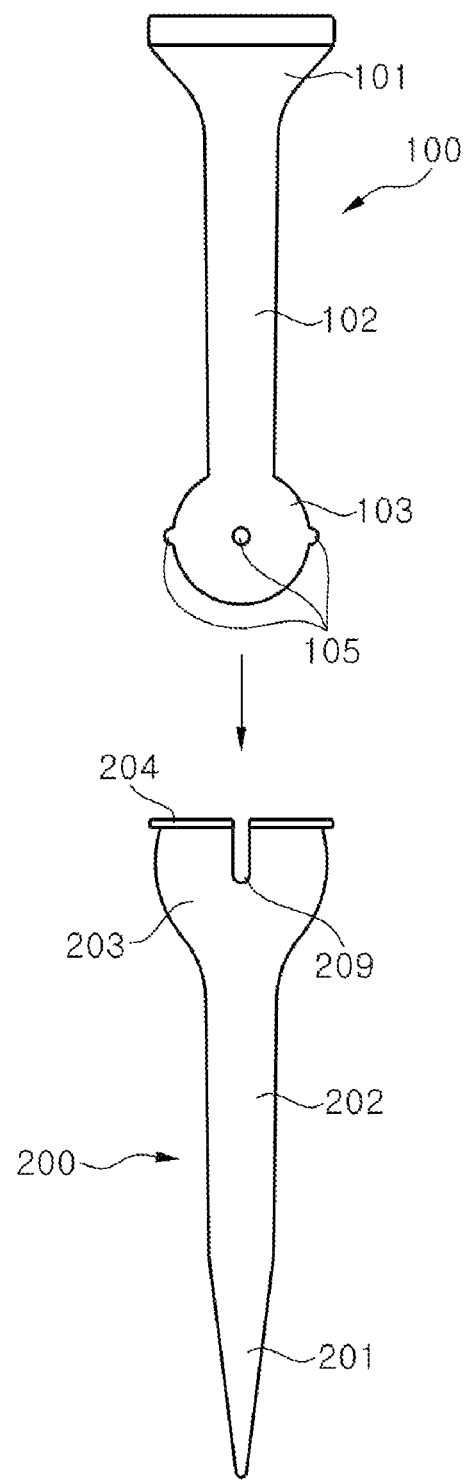
Figure 17:
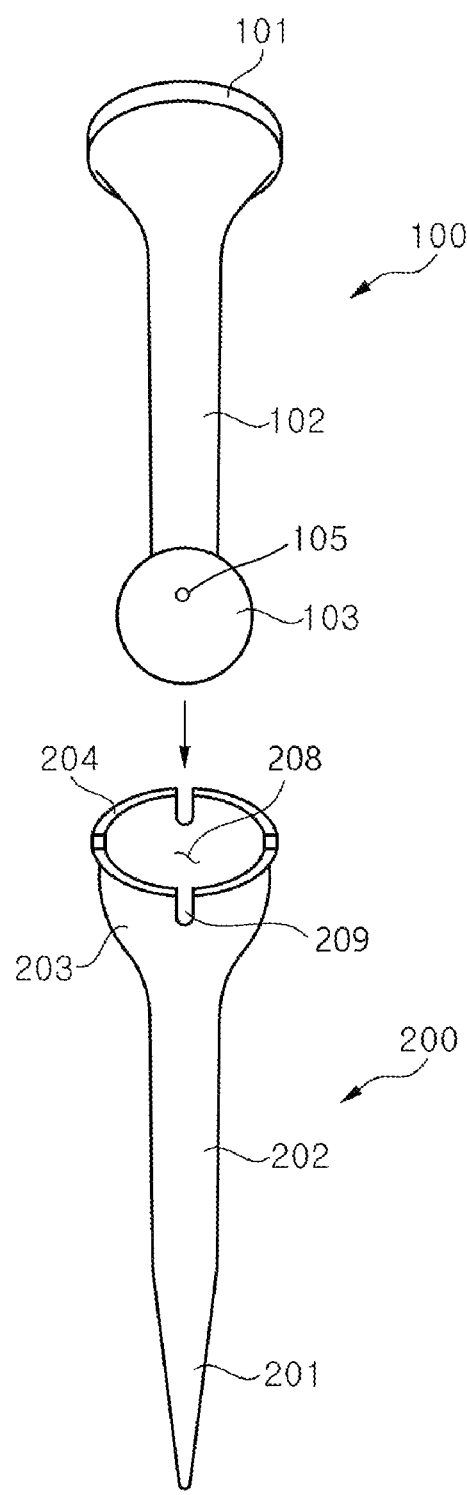
Figure 18:
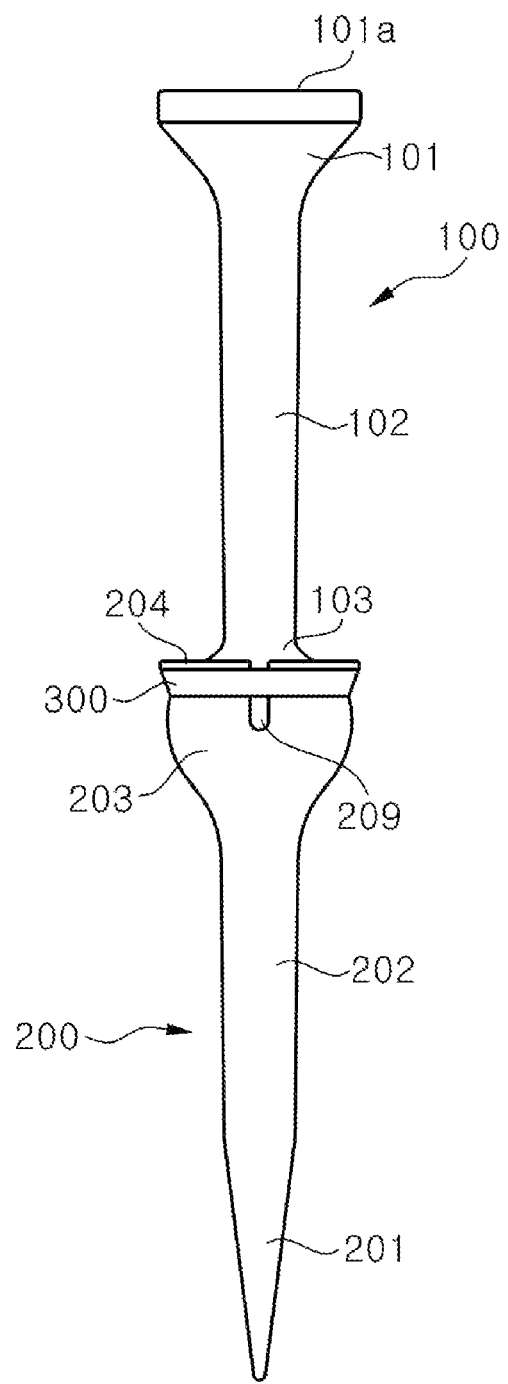
Figure 19:
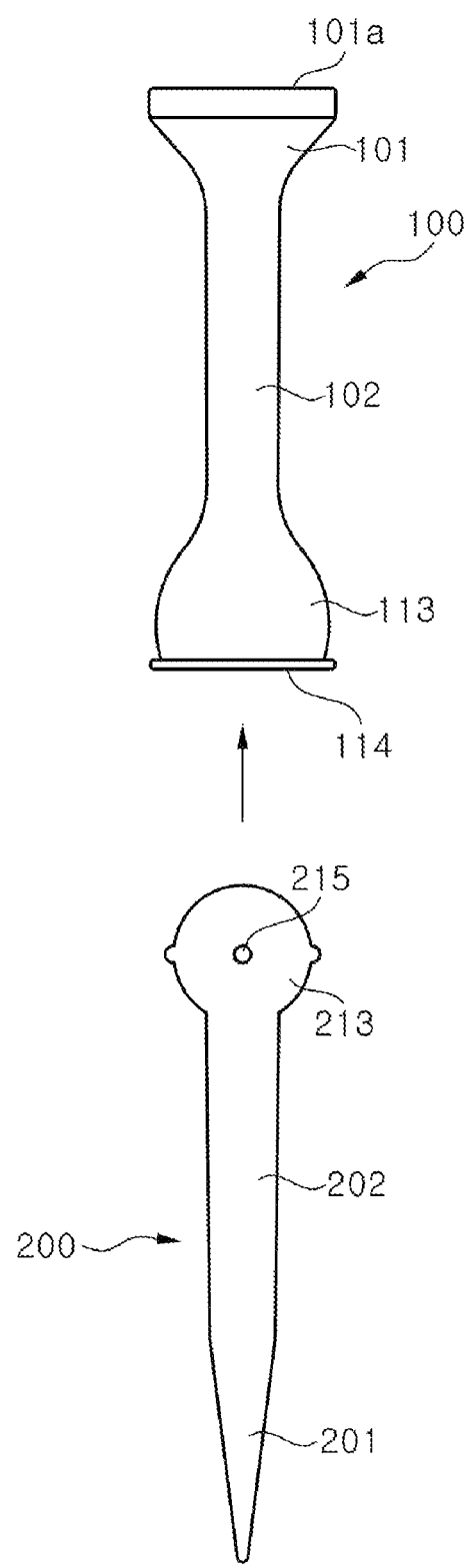
FIG. 19 is an exploded view and a golf tee according to yet another embodiment, illustrating a support and a rotary portion thereof.
Figure 20:
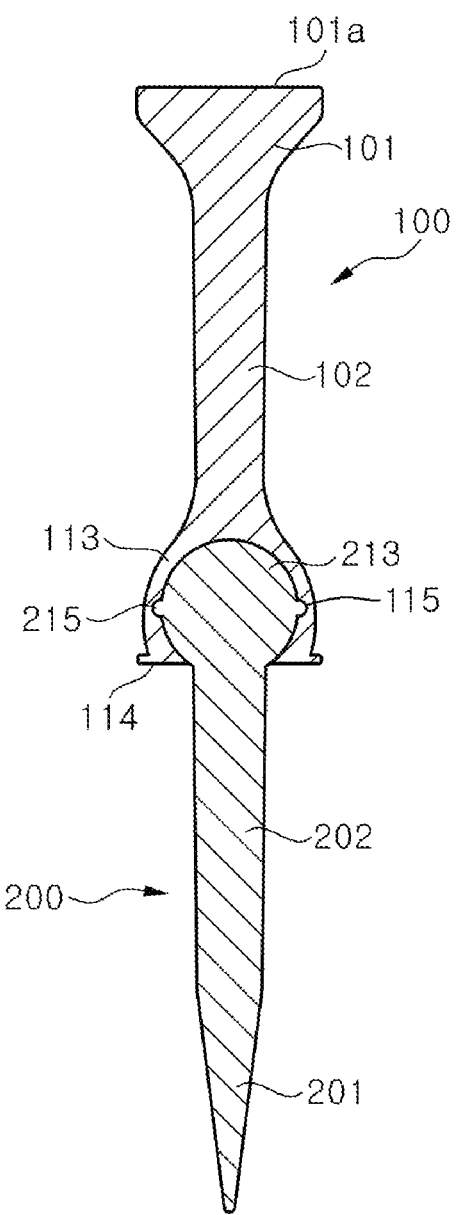
FIG. 20 is a sectional view of the golf tee according to the embodiment.
Figure 21:
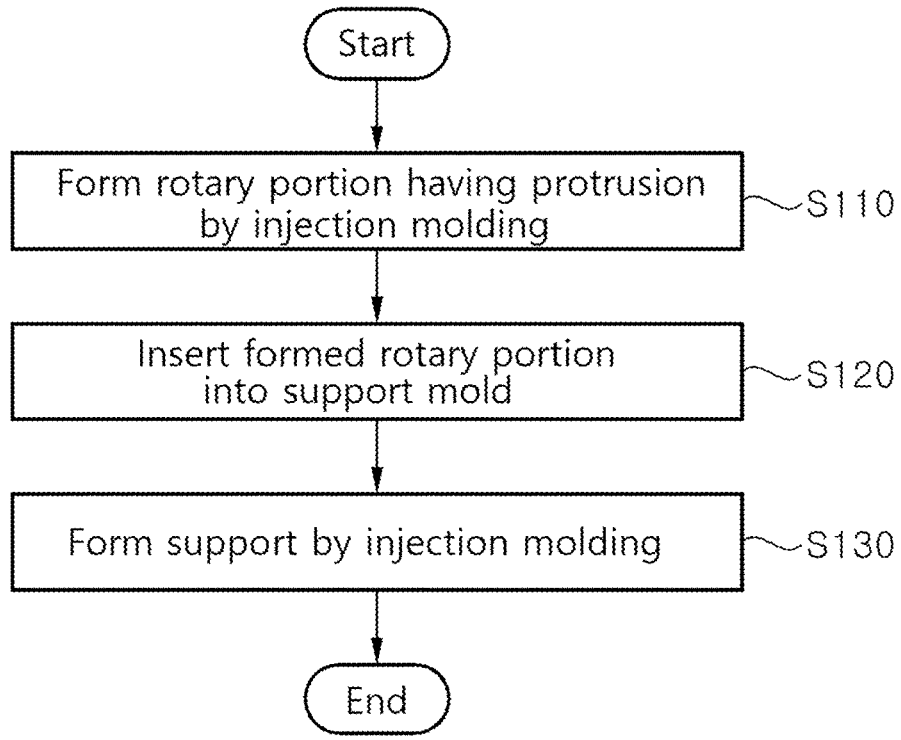
FIG. 21 and FIG. 22 are flowcharts of golf tee manufacturing methods according to the present invention.
Figure 22:
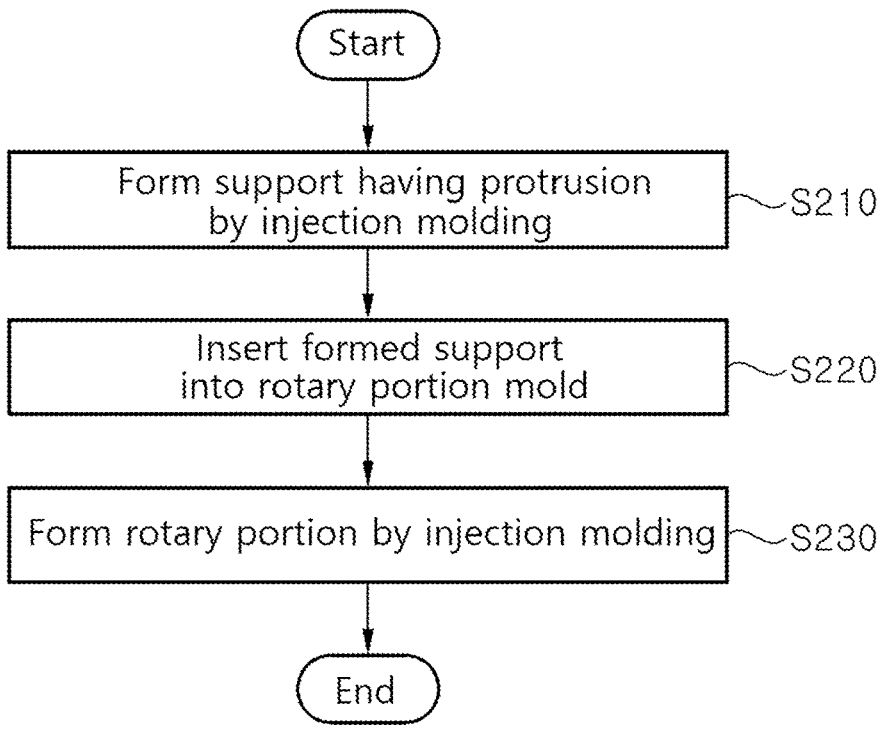

FIG. 14 is a view illustrating positions of the golf tee in use. Referring to FIG. 14(a), the golf tee is installed by inserting the support 200 into the ground with the rotary portion 100 vertically aligned with the support 200 and then a golf ball is placed on the upper surface of the rotary portion 100.

When the angle of the rotary portion 100 with respect to the support 200 is changed due to movement of the rotary portion 100 by a tee shot or the like, that is, when the rotary portion 100 is moved from a vertical position to a non-vertical position with respect to the support 200, as shown in FIG. 14(b), the rotary portion 100 can be returned to the vertical position by a user simply rotating the rotary portion 100 such that the protrusion 105 of the rotary portion 100 is received in the receiving groove 205 of the support, as shown in FIG. 14(*c*).

Here, the protrusion 105 may be fitted in the receiving groove 205 while making a "click" sound indicating that the rotary portion 100 is moved to a correct vertical position.

Accordingly, a user can easily confirm that the support 200 and the rotary portion 100 are vertically aligned with each other. In addition, since the rotary portion 100 is naturally adjusted to a correct vertical position with respect to the support 200, there is no need for a user to finely adjust the rotary portion 100 to the correct vertical position.

FIG. 15 to FIG. 18 are views of the golf tee according to yet another embodiment of the present invention. Referring to FIG. 15 to FIG. 18, the support 200 may include multiple cutouts 209 formed at the receiving portion 203 to allow the receiving portion 203 to be elastically deformable such that the coupling portion 103 of the rotary portion can be easily coupled to or separated from the receiving portion 203.

In addition, the support 200 may further include a securing member 300 coupled to the outer circumferential surface of the receiving portion 203.

The cutouts 209 of the receiving portion 203 allows easy coupling of the coupling portion 103 of the rotary portion 100 to the receiving portion 203. Specifically, the cutouts 209 allow easy insertion/separation of the coupling portion 103 into/from the receiving portion 203 by allowing the receiving portion 203 to be elastically deformable.

That is, due to the cutouts 205, the insertion hole 208 can be expanded in size upon inserting the coupling portion 103 into the receiving portion 203 and can be reduced in size after insertion of the coupling portion 103, thereby allowing smooth insertion of the coupling portion 103 into the receiving portion 203 of the support 200.

In addition, the cutouts 209 may be formed in the upper hemisphere of the receiving portion 203 with respect to the center of the receiving portion 203 to achieve both protection of the coupling portion 103 from impact upon hitting and ease of coupling of the coupling portion 103 to the receiving portion 203.

The securing member 300 may be formed in the shape of a ring through injection molding or may be formed of an elastic material. Due to elasticity thereof, the securing member 300 can firmly secure the coupling portion 103 inserted into and coupled to the receiving portion 203 through a clamping operation on the outer circumferential surface of the receiving portion 203.

In addition, the securing member 300 is coupled to the upper hemisphere of the receiving portion 203 with respect to the center of the receiving portion 203. Since the receiving portion 203 is curved toward the center thereof, the securing member 300 coupled to the outer circumferential surface of the receiving portion 203 can be moved toward the upper end of the receiving portion 203.

Here, the stepped portion 204 can prevent separation of the securing member 300 from the receiving portion 203 by restricting movement of the securing member 300 beyond the upper end of the upper hemisphere of the receiving portion 203.

The securing member 300 may be coupled to the outer circumferential surface of the receiving portion 203 to firmly secure the coupling portion 103 inserted into and coupled to the receiving portion 203 through a clamping operation.

In addition, the securing member 300 may be coupled to the upper hemisphere of receiving portion 203 with respect to the center of the receiving portion 203, and may be held in position by the stepped portion 204.

A golf tee according to yet another embodiment of the present invention may include a support 200 inserted into the ground and a rotary portion 100 rotatably coupled to the support 200 and having an upper surface on which a golf ball rests, wherein the rotary portion 100 may include a head 101 formed at one side thereof and allowing a golf ball to be placed thereon, a hollow receiving portion 113 formed at the other side thereof and having an open insertion hole, and a stepped portion 114 protruding outside a lower surface of the receiving portion 113.

The support 200 may include a pointed insertion portion 201 formed at a lower portion thereof and inserted into the ground and a coupling portion 213 formed at an upper portion thereof, protruding above the ground, and coupled to the rotary portion 100, wherein the coupling portion 213 of the support 100 may be inserted into and coupled to the receiving portion 113 of the rotary portion 100.

In addition, the coupling portion 213 may include a protrusion 215 formed at a portion of an outer circumferential surface thereof and the receiving portion 113 may include a receiving groove 115 receiving the protrusion 215 therein, such that the support 200 and the rotary portion 100 are vertically aligned with each other with the protrusion 215 received in the receiving groove 115.

Next, a golf tee manufacturing method according to the present invention will be described with reference to FIG. 21 to FIG. 24.

In one embodiment, the golf tee manufacturing method may include a primary injection molding step S110 in which a rotary portion having a protrusion is formed by injection molding (insert injection molding), an insertion step S120 in which the formed rotary portion is inserted into a support mold, and a secondary injection molding step S130 in which a support is formed by injection molding.

In another embodiment, the golf tee manufacturing method may include a primary injection molding step S210 in which a support having a protrusion is formed by injection molding, an insertion step S220 in which the formed support is inserted into a rotary portion mold, and a secondary injection molding step S230 in which a rotary portion is formed by injection molding.

Figure 23:
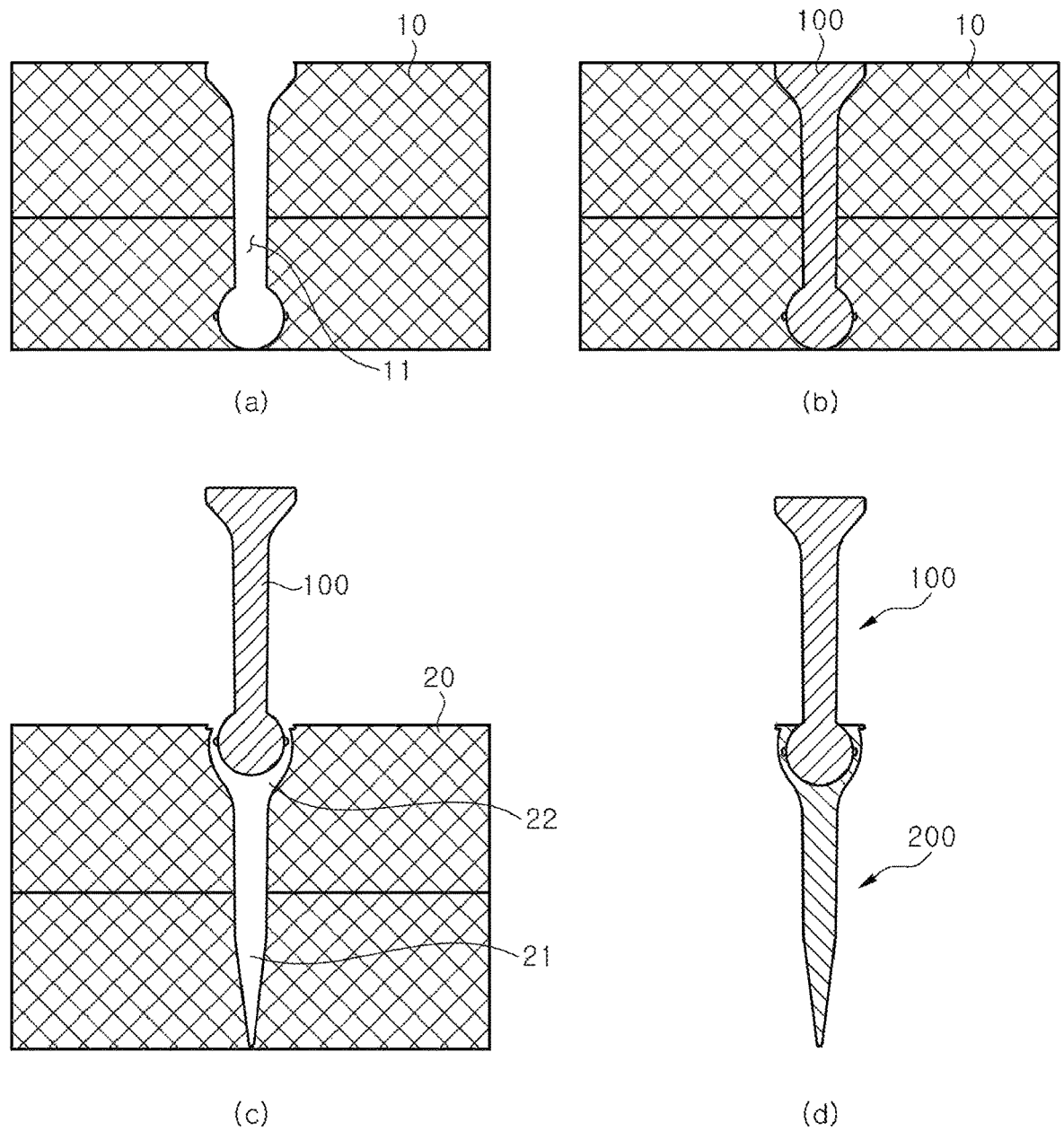
FIG. 23 is a view illustrating a process of manufacturing a rotary portion and a support by the golf tee manufacturing method of FIG. 21.
Figure 24:
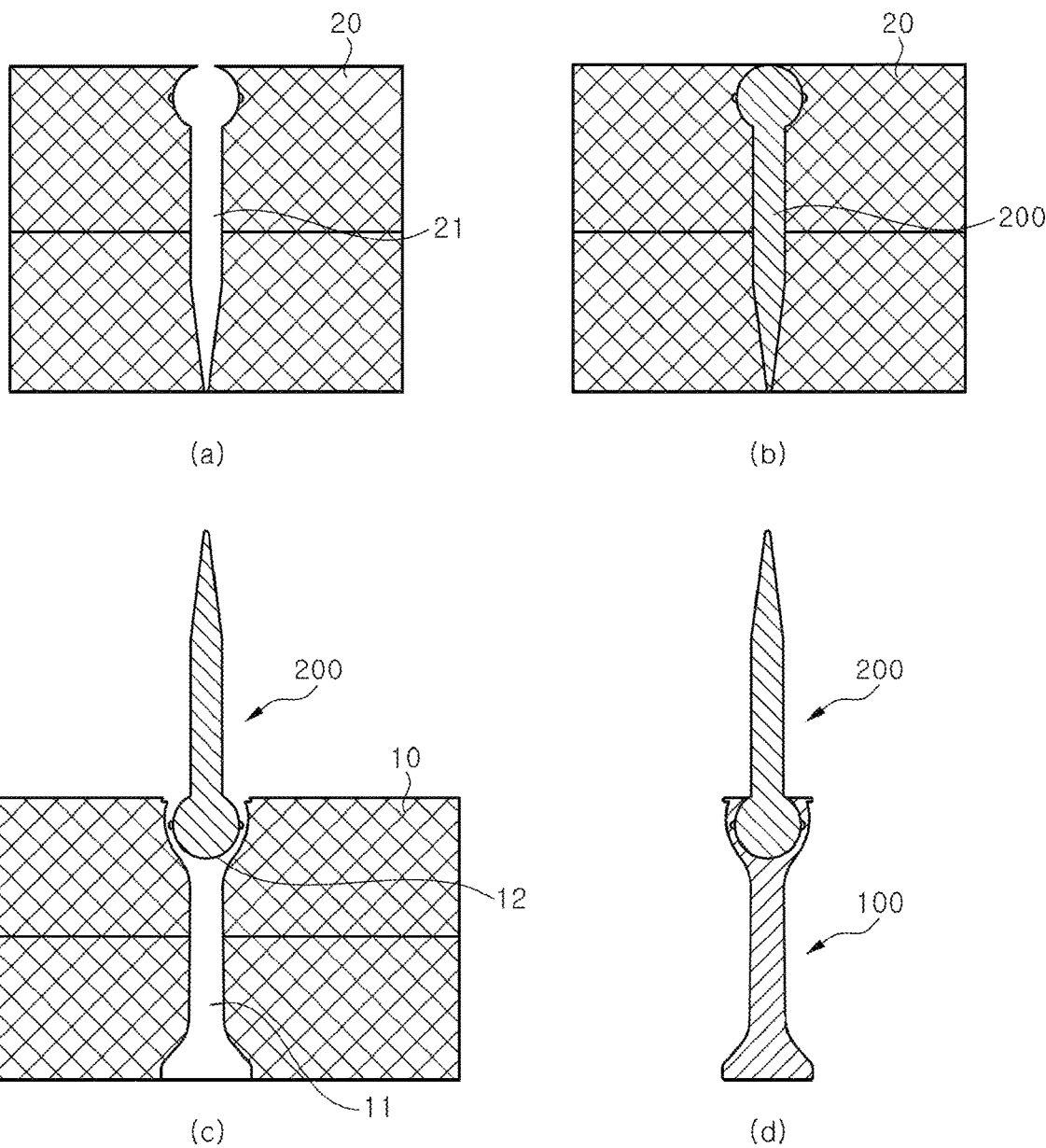
FIG. 24 is a view illustrating a process of manufacturing a rotary portion and a support by the golf tee manufacturing method of FIG. 22.

That is, the golf tee manufacturing method according to the present invention is a method of manufacturing a golf tee including a support 200 inserted into the ground and a rotary portion 100 rotatably coupled to the support and having an upper surface on which a golf ball rests, and may include a primary injection molding step S110 (see FIG. 23(*b*)) in which a rotary portion 100 having a protrusion 105 is formed by injection molding using a rotary portion mold 10 as shown in FIG. 23(*a*), an insertion step S120 (see FIG. 23(*c*)) in which the rotary portion 100 formed in the primary injection molding step S110 is inserted in a vertically aligned position into an insertion space 22 in a molding groove 21 of a support mold 20, and a secondary injection molding step S130 in which a support 200 having a receiving groove 205 receiving the protrusion 105 of the rotary portion 100 therein is formed by injection molding using the support mold 20 with the rotary portion 100 inserted into the insertion space 22, wherein the primary injection molding step S110 and the secondary injection molding step S130 may be performed under different injection molding conditions.

The primary injection molding step S110 may include forming a rotary portion 100 having a protrusion 105 by injection molding or forming a support 200 having a protrusion 215 by injection molding.

The insertion step S120 may include inserting the rotary portion 100 formed in the primary injection molding step S110 into an insertion space 22 in a molding groove 21 of a support mold 20 or inserting the support 200 formed in the primary injection molding step S110 into an insertion space 12 in a molding groove 11 of a rotary portion mold 10. When the injection molded product formed in the primary injection molding step S110 is the rotary portion 100, the secondary injection molding step S130 may include forming a support 200 having a receiving groove 205 receiving the protrusion 105 of the rotary portion 100 therein by injection molding using the support mold 20 with the rotary portion 100 inserted into the insertion space 22.

When the injection molded product formed in the primary injection molding step S110 is the support 200, the secondary injection molding step S130 may include forming a rotary portion 100 having a receiving groove 115 receiving the protrusion 215 of the support 200 therein by injection molding using the rotary portion mold 10 with the support 200 inserted into the insertion space 12.

With regard to injection molding conditions, the primary injection molding step S110 and the secondary injection molding step S130 may be performed using different materials or at different temperatures (° C.).

For example, the primary injection molding step S110 may be performed using polycarbonate (PC) and the secondary injection molding step S130 may be performed using polypropylene (PP) or polyethylene (PE).

In addition, the primary injection molding step S110 may be performed at a lower temperature than the secondary injection molding step S130.

In this way, it is possible to prevent deformation of the injection molded product formed in the primary injection molding step S110 during the secondary injection molding step S130, thereby allowing coupling between the injection molded product formed in the primary injection molding step and the injection molded product formed in the secondary injection molding step.

That is, by performing the insertion step and the secondary injection molding step after the primary injection molding step, it is possible to eliminate the need for a separate post-process such as an assembly process, thereby improving ease of manufacture. In addition, by performing the primary injection molding step and the secondary injection molding step under different injection molding conditions, it is possible to prevent deformation of the injection molded product formed in the primary injection molding step during the secondary injection molding step, thereby allowing secure coupling between the support 200 and the rotary portion 100, while achieving smooth control over the angle of the rotary portion on the support and correct vertical alignment of the rotary portion and the support through minimization in dimensional difference between the injection molded products formed in the primary injection molding step and the secondary injection molding step.

As described above, the embodiments of the present invention provide a golf tee including a support inserted into the ground and a rotary portion rotatably coupled to the support and allowing a golf ball to be placed thereon, wherein the golf tee can be easily installed perpendicular to the ground through adjustment of the angle of the rotary portion on the support, can minimize damage thereto by allowing the rotary portion to rotate in a hitting direction upon hitting a golf ball, and can achieve easy restoration of the support and the rotary portion to a vertically aligned position after hitting.

In addition, the embodiments of the present invention provide a golf tee including a support and a rotary portion coupled to each other by injection molding, wherein one of the support and the rotary portion has a protrusion and the other one has a receiving groove receiving the protrusion therein, thereby allowing easy restoration of the support and the rotary portion to a correct vertically aligned position when the angle of the rotary portion with respect to the support is changed.

Although some embodiments of the golf tee according to the present invention and the manufacturing method thereof have been described herein, it will be understood that various modifications, changes, and alterations can be made by those skilled in the art without departing from the spirit and scope of the invention.

Therefore, the scope of the present invention should be defined by the appended claims and equivalents thereto, rather than limited to the foregoing embodiments.

That is, it will be understood that the foregoing embodiments are provided for illustration only and are not to be in any way construed as limiting the present invention, that the scope of the present invention is defined by the appended claims rather than the detailed description herein, and that the appended claims and equivalents thereto are intended to cover such modifications, changes, and alterations as would fall within the scope and spirit of the invention.

What is claimed is:

1. A golf tee comprising:
   a support inserted into the ground; and
   a rotary portion rotatably coupled to the support and having an upper surface on which a golf ball rests,
   wherein the rotary portion comprises a head on which the golf ball is placed and a coupling portion formed opposite the head and coupled to the support; and
   the support comprises a pointed insertion portion formed at a lower portion thereof and inserted into the ground, a hollow receiving portion formed at an upper portion thereof and protruding above the ground, the receiving portion having an insertion hole open at one side thereof, multiple cutouts formed in the receiving portion to allow the receiving portion to be elastically deformable such that the coupling portion of the rotary portion is inserted into or separated from the receiving portion, a stepped portion protruding outside an upper surface of the receiving portion, and a securing member coupled to an outer circumferential surface of the receiving portion to firmly secure the coupling portion inserted into and coupled to the receiving portion through a clamping operation, the securing member having a ring shape.

2. The golf tee according to claim 1, wherein the cutouts are formed in an upper hemisphere of the receiving portion with respect to a center of the receiving portion to protect the coupling portion from impact upon hitting and to facilitate coupling/separation of the receiving portion to/from the coupling portion.

3. A golf tee comprising:
   a support inserted into the ground; and
   a rotary portion rotatably coupled to the support and having an upper surface on which a golf ball rests,
   wherein the support comprises a pointed insertion portion formed at a lower portion thereof and inserted into the ground, a hollow receiving portion formed at an upper portion thereof and protruding above the ground, the receiving portion having an insertion hole open at one side thereof, and a stepped portion protruding outside an upper surface of the receiving portion;

the rotary portion comprises a head formed at one side thereof and allowing a golf ball to rest thereon and a coupling portion formed at the other side thereof and coupled to the support;

the coupling portion of the rotary portion is inserted into and coupled to the receiving portion of the support; and the coupling portion has a protrusion formed at a portion of an outer circumferential surface thereof and the receiving portion has a receiving groove receiving the protrusion therein such that the support and the rotary portion are vertically aligned with each other with the protrusion received in the receiving groove, wherein the support further comprises:

multiple cutouts formed in the receiving portion to allow the receiving portion to be elastically deformable such that the coupling portion of the rotary portion is coupled to or separated from the receiving portion; and a securing member coupled to an outer circumferential surface of the receiving portion to firmly secure the coupling portion inserted into and coupled to the receiving portion through a clamping operation.

4. A golf tee comprising:

a support inserted into the ground; and a rotary portion rotatably coupled to the support and having an upper surface on which a golf ball rests, wherein the rotary portion comprises a head formed at one side thereof and allowing a golf ball to rest thereon, a hollow receiving portion formed at the other side thereof and having an open insertion hole, and a stepped portion protruding outside a lower surface of the receiving portion;

the support comprises a pointed insertion portion formed at a lower portion thereof and inserted into the ground and a coupling portion formed at an upper portion thereof, protruding above the ground, and coupled to the rotary portion;

the coupling portion of the support is inserted into and coupled to the receiving portion of the rotary portion; and the coupling portion has a protrusion formed at a portion of an outer circumferential surface thereof and the receiving portion has a receiving groove receiving the protrusion therein such that the support and the rotary portion are vertically aligned with each other with the protrusion received in the receiving groove, wherein the rotary portion further comprises:

multiple cutouts formed in the receiving portion to allow the receiving portion to be elastically deformable such that the coupling portion of the support is coupled to or separated from the receiving portion; and a securing member coupled to an outer circumferential surface of the receiving portion to firmly secure the coupling portion inserted into and coupled to the receiving portion through a clamping operation.

5. The golf tee according to claim 3, wherein:

the protrusion comprises at least one protrusion formed at a portion of the outer circumferential surface of the coupling portion or is continuously formed around the outer circumferential surface of the coupling portion;

the receiving groove comprises at least one receiving groove formed at a portion of an inner peripheral surface of the receiving portion or is continuously formed around the inner peripheral surface of the receiving portion; and the support and the rotary portion are vertically aligned with each other with the protrusion received in the receiving groove.

6. The golf tee according to claim 3, wherein the securing member is coupled to an upper hemisphere of the receiving portion with respect to a center of the receiving portion and is held in position by the stepped portion.

7. The golf tee according to claim 4, wherein:

the protrusion comprises at least one protrusion formed at a portion of the outer circumferential surface of the coupling portion or is continuously formed around the outer circumferential surface of the coupling portion;

the receiving groove comprises at least one receiving groove formed at a portion of an inner peripheral surface of the receiving portion or is continuously formed around the inner peripheral surface of the receiving portion; and the support and the rotary portion are vertically aligned with each other with the protrusion received in the receiving groove.

* * * * *